United States Patent [19]

Bidabad

[11] Patent Number: 4,892,394
[45] Date of Patent: Jan. 9, 1990

[54] ELECTRONIC SUN SHIELD

[76] Inventor: Farid M. Bidabad, P.O. Box 41262, San Jose, Calif. 95160

[21] Appl. No.: 189,947

[22] Filed: May 3, 1988

[51] Int. Cl.$^4$ ............................ G02F 1/17; G02F 1/23
[52] U.S. Cl. ...................................... 350/357; 340/785
[58] Field of Search ............... 350/357, 355, 356, 353; 340/785

[56] References Cited

U.S. PATENT DOCUMENTS

| | | | |
|---|---|---|---|
| 3,652,149 | 3/1972 | Rogers | 350/357 |
| 4,526,441 | 7/1985 | Dowden et al. | 350/357 |
| 4,649,382 | 3/1987 | Martin et al. | 350/357 X |
| 4,702,566 | 10/1987 | Tukude | 350/357 |
| 4,750,816 | 6/1988 | Ito et al. | 350/357 |

FOREIGN PATENT DOCUMENTS 0184129 10/1983 Japan .

Primary Examiner—Eugene R. LaRoche
Assistant Examiner—Nathan W. McCutcheon
Attorney, Agent, or Firm—H. Jay Spiegel

[57] ABSTRACT

The electronic sun shield is an electronically operated grid that enables the operators of motor vehicles and other vehicles (such as airplanes) to control the shading of their windshields. It employs electrochromic technology to electronically darken section or sections of the windshield in order to minimize the effects of glare from the sun, reflective objects, or the lights of other vehicles, as driving conditions dictate. In addition, all sections of the windshield can be darkened at once when the vehicle is parked, or at other times, to shield the interior from the sun.

10 Claims, 6 Drawing Sheets

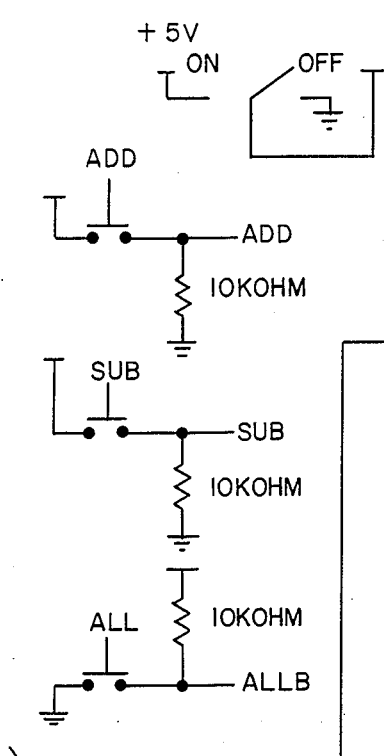
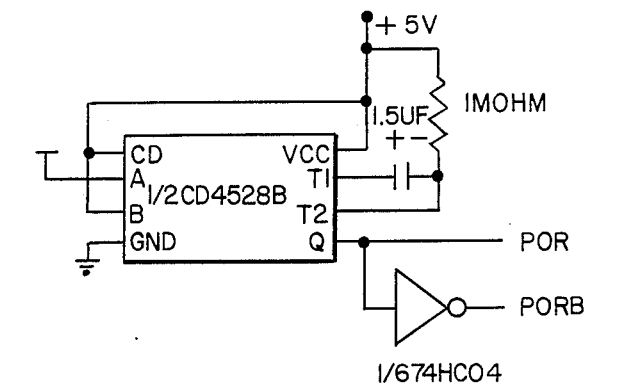
FIG. 3
FIG. 4
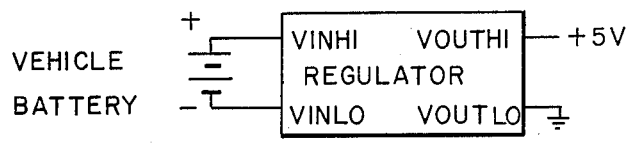
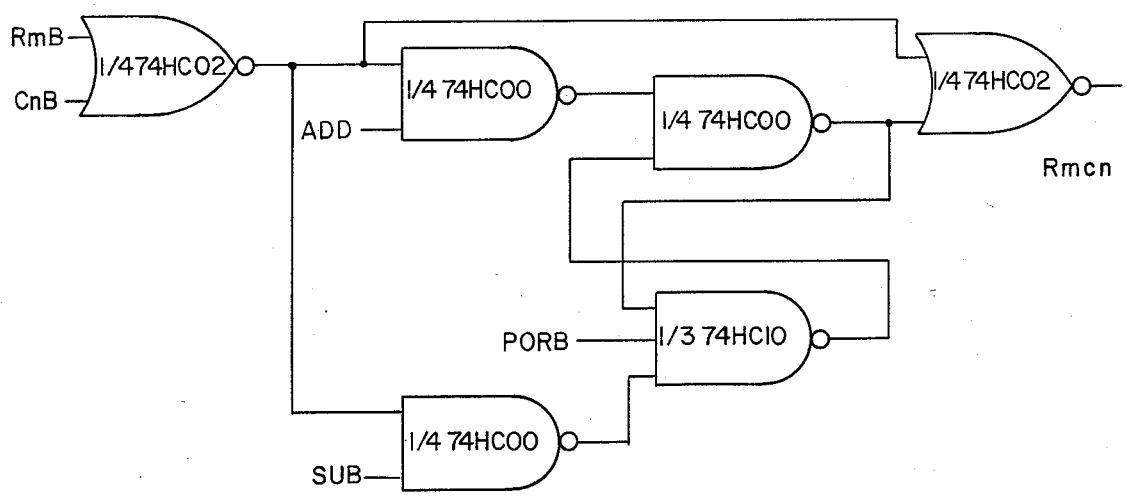
FIG. 7

ELECTRONIC SUN SHIELD

BACKGROUND OF THE INVENTION

The present invention relates to an electronic sun shield. In the prior art, it is known to provide means for obscuring a vehicle windshield through the use of some device which is associated with the windshield. The following prior art is known to applicant: U.S. Pat. No. 3,280,701 to Donnelly, et al., U.S. Pat. No. 3,639,481 to Innes, U.S. Pat. No. 3,652,149 to Rogers, U.S. Pat. No. 3,695,681 to Dockery, U.S. Pat. No. 3,774,988 to Rogers, U.S. Pat. No. 3,951,521 to Findl, U.S. Pat. No. 4,338,000 to Kamimori, et al., U.S. Pat. No. 4,410,887 to Stolav, et al., U.S. Pat. No. 4,435,048 to Kamimori, et al., and U.S. Pat. No. 4,671,619 to Kamimori, et al.

Dockery teaches a device including the use of a tinted liquid circulating in a compartment formed in a vehicle windshield. Innes and Stolav, et al. each teach the concept of a liquid crystal display device wherein light transmission therethrough is selectively controlled, with Innes disclosing the use of the invention in "automobile windows and windshields".

Each of the other references listed above teaches the concept of electrochromic technology applied to a glass surface to vary light transmission therethrough. Some f these patents disclose the use of such a device on a vehicle window such as a windshield.

However, none of the above listed and discussed United States patents teaches the concept of dividing up a vehicle windshield into a plurality of sectors which are treated with an electrochromic material and through the use of electrical circuitry may be selectively darkened as desired to reduce glare on a portion of the windshield.

SUMMARY OF THE INVENTION

The present invention relates to an improved electronic sun shield. The present invention includes the following interrelated aspects and features:

(a) In a first embodiment of the present invention, the windshield of a vehicle is divided into a plurality of sectors in grid-like form with these sectors being treated with an electrochromic material and with electronics being incorporated therein allowing each sector to be individually darkened and lightened where desired.

(b) For this purpose, a control switch is provided having an ON-OFF switch as well as switches controlling movement of the position of the obscured sector on the grid as desired. Furthermore, the control means includes circuitry allowing a plurality of sectors to be simultaneously darkened or lightened as desired.

(c) In a second embodiment of the present invention, an electronic compass may be incorporated into the circuitry along with switches allowing for either manual or automatic operation of the device. When the automatic mode is selected, the electronic compass is connected into the system in such a manner that as the vehicle changes heading, the sector or sectors on the windshield which are to be darkened and/or lightened are changed to accommodate changes in orientation of the vehicle so that glare to the eyes of the driver is prevented.

As such, it is a first object of the present invention to provide an improved electronic sun shield.

It is a further object of the present invention to provide such an improved electronic sun shield including dividing of a vehicle windshield into a plurality of sectors, each one of which may be selectively darkened or lightened through the use of electrochromic technology.

It is a still further object of the present invention to provide such a device wherein automatic control may be responsive to the orientation of the vehicle.

These and other objects, aspects and features of the present invention will be better understood from the following detailed description of the preferred embodiments read in conjunction with the appended drawing figures.

BRIEF DESCRIPTION OF THE DRAWINGS

FIG. 3 shows a "power on reset" sub-circuit, ON-OFF switch, and memory and ALL switches included in the circuitry of the first embodiment of the present invention.

FIG. 4 shows a voltage regulator sub-circuit of the first embodiment of the present invention.

FIG. 7 shows a latching decoder sub-circuit which is utilized in the circuitry of the first embodiment of the present invention.

SPECIFIC DESCRIPTION OF THE PREFERRED EMBODIMENTS

Figure 1:
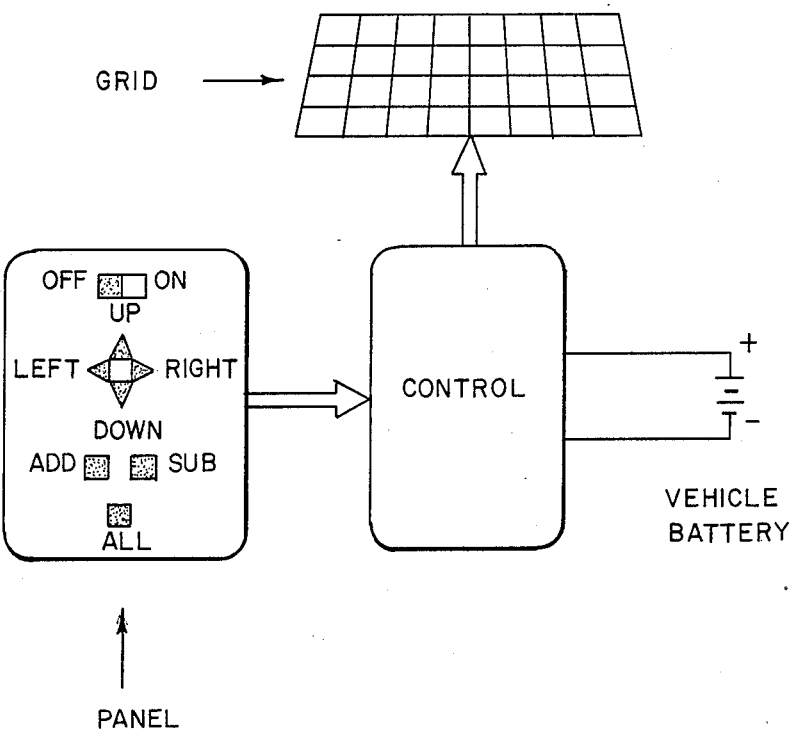
FIG. 1 shows a schematic representation of a first embodiment of the present invention.

As shown in FIG. 1, the Electronic Sun Shield consists of three major blocks, a grid, a panel and a control.

The grid is a normally transparent film which is either attached to the windshield of the vehicle after it is manufactured, or is constructed as an integral part of the windshield. In either case, it could be a pre-market or an after-market item. It employs electrochromic technology to alter the amount of light transmission through the windshield. The grid is made up of an array of electrochromic "sectors", configured in several rows and columns. A typical configuration, for example, could be four rows and eight columns, as shown in FIG. 1. Each sector is made up of two electrode layers constructed from special materials, sandwiching a conductive electrolyte, as is well known. When there is no electric current, both electrodes are transparent. However, application of a voltage forces some of the electrolyte's ions into the crystal lattice of one of the electrodes, causing the material to become less transparent. If this voltage is reversed, the voltage extracts the ions from the electrode, turning it clear again. The transparency of each sector is individually controlled by the control block. The control block receives information from the operator of the vehicle and applies the appropriate voltage to the particular sector or sectors of the grid which are to be "darkened" to block the glare.

In its reflective state, the electrochromic material affects not only the visible spectrum of the radiant energy, but also the thermal (infrared) range. The interior of the vehicle can thus be shielded from the sun and protected from excessive heat build-up in hot weather by switching all the sectors into their "darkened" state.

Technology employing electrochromic materials is currently in the development stage but appears certain to be employed in numerous practical applications in the near future. The electronic equivalent of photosensitive glass, it functions in the reverse in that the atomic status of the transparent medium is altered initially through electronics to control the passage of light, as opposed to the medium's reacting to the light itself. Development work in electrochromic technologies is currently in progress to the knowledge of applicant by manufacturers Gentex, Donnely, and EIC Laboratories.

The operator of the vehicle uses the panel to select the sector or sectors of the grid which are to be darkened or lightened. In order to facilitate the naming of the sectors, a convention is defined as follows: each sector is given a name as RmCn where m and n designate the row and column the sector is occupying. The panel consists of a toggle switch and seven pushbutton switches.

Figure 2:
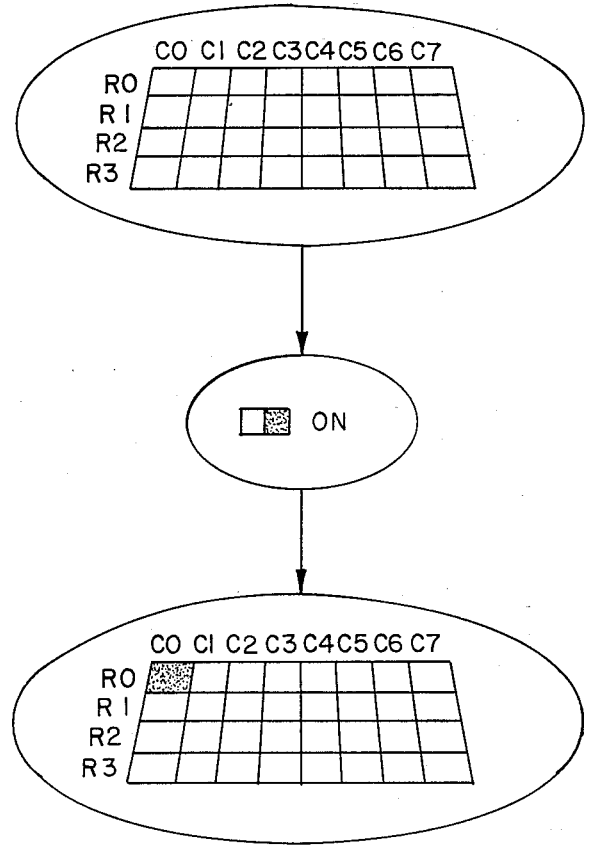
FIG. 2 shows a schematic representation of the grid portion of the device and changes thereto when the device is activated.
Figure 5A:
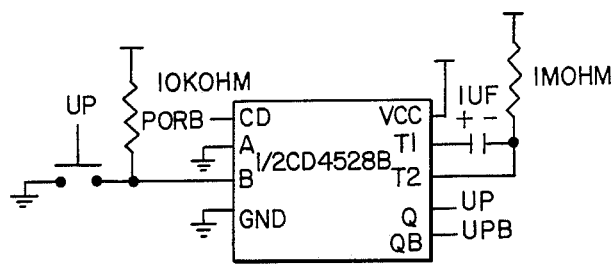
FIGS. 5a, 5b, 5c and 5d show schematic representations of dual monostable multivibrators which are included in the circuitry of the present invention and which are designed to generate an appropriate control pulse when one of the four "direction" buttons is pressed.
Figure 5B:
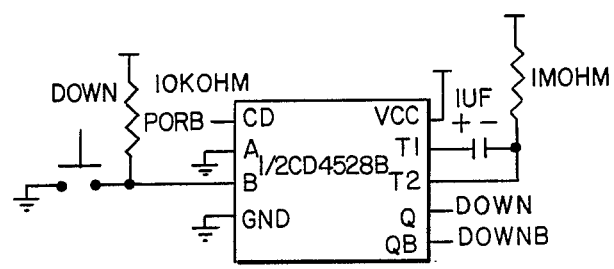
Figure 5C:
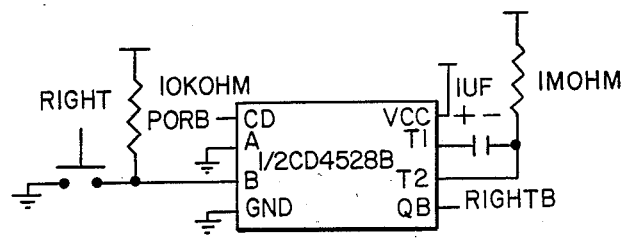
Figure 5D:
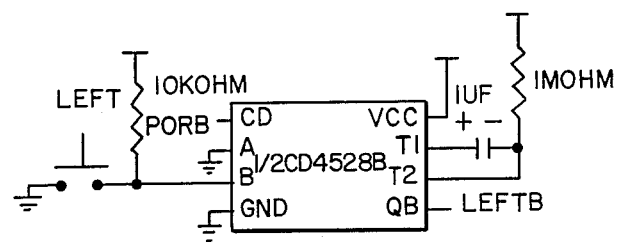

The ON-OFF toggle switch controls the power to the system. When the inventive system is first powered up, the upper left sector of the grid (sector R0C0) switches to its dark state (FIG. 2). It should be noted that throughout this paper, the grid (windshield) is illustrated as seen by the operator of the vehicle; i.e., view from inside of the vehicle.

The operator then uses the RIGHT, LEFT, UP, and/or DOWN buttons to "move" the shaded sector to where he/she sees the glare through the windshield. This is similar to the "cursor" in a computer and hence in this application, the movable shaded sector will be referred to as the cursor. Each press of the above four buttons causes the shaded sector (cursor) to move to the corresponding direction by one sector. Suppose the glare from the sun is reaching the driver's eyes through sector R1C1. The operator uses the RIGHT and then the DOWN button to move the cursor to R0C1 and then R1C1.

If the cursor is on the border of the grid, a command to move it to the outside of the grid causes a "wrap" to occur; i.e., the sector in the same row/column but at the other end of the grid is darkened. The effect of pressing the RIGHT button when the cursor is on the R1C7 sector is as follows: since there are no sectors to the right of R1C7, a wrap occurs and the cursor moves to R1C0. Similarly, if, for example, the cursor was on R3C3 and the DOWN button was pressed, the cursor would have moved to R0C3.

If desired, a larger block than the area covered by one sector can be darkened. This is done by moving the cursor to the desired location, pressing the ADD button, and moving it to the next desired location. This process can be repeated as many times as desired until all the desired areas are covered. An example of this sequence of events is explained as follows. Suppose the glare is reaching the driver's eyes through the windshield where sectors R1C3 and R1C4 are located. The cursor is moved to R1C4. When the ADD button is pressed, this location is written into the memory and remains darkened even when the LEFT button is pressed to cover sector R1C3. This feature allows the inventive system to also be used as a traditional sun visor. Since the sun rays reach the driver and the passenger at different points on the windshield, they can each darken the sectors they see the glare through, by using the direction and ADD buttons. For example, to darken sectors R0C1, R0C2, R0C5 and R0C6, the sequence of events after a power up will be: RIGHT, ADD RIGHT, ADD, RIGHT, RIGHT, RIGHT, ADD, RIGHT.

In case a sector is mistakenly entered into the memory by the ADD button, it can be erased from the memory by the SUB button. As an example, let's assume that sectors R0C1, R0C2 and R0C3 were ADDed to the memory. If sector R0C3 is to be returned to its clear state, the cursor is first moved to that sector, the SUB button is pressed to erase it from the memory, and then the cursor is moved to the left leaving sector R0C3 clear.

When the vehicle is to be parked under the sun, pressing the ALL button will darken the whole windshield, protecting the interior of the vehicle from the sun and reducing heat build-up. The system has to be turned off and then on again when the operator returns, in order to reset it to its original state (R0C0 darkened only).

As the vehicle is driven, its heading, most probably, also changes and a need might arise to move the darkened sector or sectors around, in order to cover the glare. The six buttons mentioned above (four direction and two memory buttons) are used to keep the glare covered under one or more shaded sectors.

The control block includes all the electronic circuitry which controls the electrochromic grid depending upon the input from the operator via the panel. It should be emphasized that what is described hereinafter is exemplary. It is the concept of selectively darkening sections of the windshield through the use of electrochromic technology that is considered to comprise the present invention.

Only Small Scale Integrated (SSI) and Medium Scale Integrated (MSI) ICs were used in the exemplary circuit disclosed herein in order to keep the design as general as possible. Ultimately, in the actual production of the electronic sun shield, one custom IC or gate array could incorporate all the logic shown here.

FIG. 3 shows the "power on reset circuit, the ON-OFF switch and the memory and ALL switches, and FIG. 4 shows the voltage regulator. All of the ICs used in the exemplary circuit require a +5 Volt supply, which is most likely different than the voltage of the vehicle's battery. Therefore, a regulator is used to generate the +5 V supply needed. The ON-OFF switch connects the internal supply line (VCC) to either 0V (GND) in the OFF mode, or +5 V in the ON mode. Throughout this application, the internal supply line (VCC) is shown as:

$$\top$$

and the 0V line (GND) is shown as:

The chip designated by CD4528B in FIG. 3 is a dual monostable multivibrator that is capable of generating a pulse when an input is switched in a predetermined way. The pulsewidth is determined by the external timing resistor and capacitor. The truth table of the CD4528B chip is shown in Table A.

TABLE A

| Inputs | | | Outputs | |
|---|---|---|---|---|
| CD | A | B | Q | QB |
| L | X | X | L | H |
| X | H | X | L | H |
| X | X | L | L | H |
| H | L | ↓ | ⎍ | ⎌ |
| H | ↑ | H | ⎍ | ⎌ |

Note:
H = High Level
L = Low Level
↑ = Low to High Transition
↓ = High to Low Transition
⎍ = One High Level Pulse
⎌ = One Low Level Pulse
X = Irrelevant Half of CD4528B (one monostable multivibrator) is used to sense switching the system on. When the switch is turned from OFF to ON, VCC goes from 0V to +5 V. This is sensed by the monostable multivibrator and a high-going pulse (POR) and a low-going pulse (PORB) are generated. These two signals are used to reset and initialize the system. The timing resistor and capacitor used are preferably 1MOhm and 1.5 uF, respectively. The pulse duration is approximately 0.5 seconds. It should be noted that the VCC pin of all ICs except the monostable multivibrator used in the power on reset circuit is tied to VCC line and is at low level when the system is off. The VCC pin of the CD4528B of the power on reset circuit is tied to +5V line in order to keep it active at all times and be able to detect the powering up of the system. Rather than using the QB output of the CD4528B for PORB, one sixth of 74HC04 (Hex Inverter) is used to invert POR to generate PORB. The reason for this is that when the system is off, the VCC (power to all ICs except the power on reset's CD4528B) is at 0 Volts. However, QB of CD4528B is at +5 Volts, and would damage the ICs if connected to their inputs. By using the inverter to generate PORB from POR, the VCC input of the inverter is at 0 Volts and therefore PORB will remain at 0 Volts until the system is turned on, thereby generating the correct logic at the right time.

The four direction buttons (UP, DOWN, RIGHT, LEFT) are debounced and direction signals generated therefrom by using the same type of circuit: a monostable multivibrator (¼ CD4528B) is used to generate a high-pulse (UP, DOWN), and/or a low-pulse (UPB, DOWNB, RIGHTB, LEFTB) every time the appropriate button is pressed (FIG. 5). The push-button switches are normally open. Pull-up resistors keep the B inputs of the CD4528Bs high until a push-button switch is pressed. The high-to-low transition of the B input is sensed and a pulse of approximately 0.3 seconds is generated (external timing components are 1 MOhm and 1 uF). The clear inputs of these four ICs are tied to PORB signal to disable direction signal generation during power-up.

Figure 6:
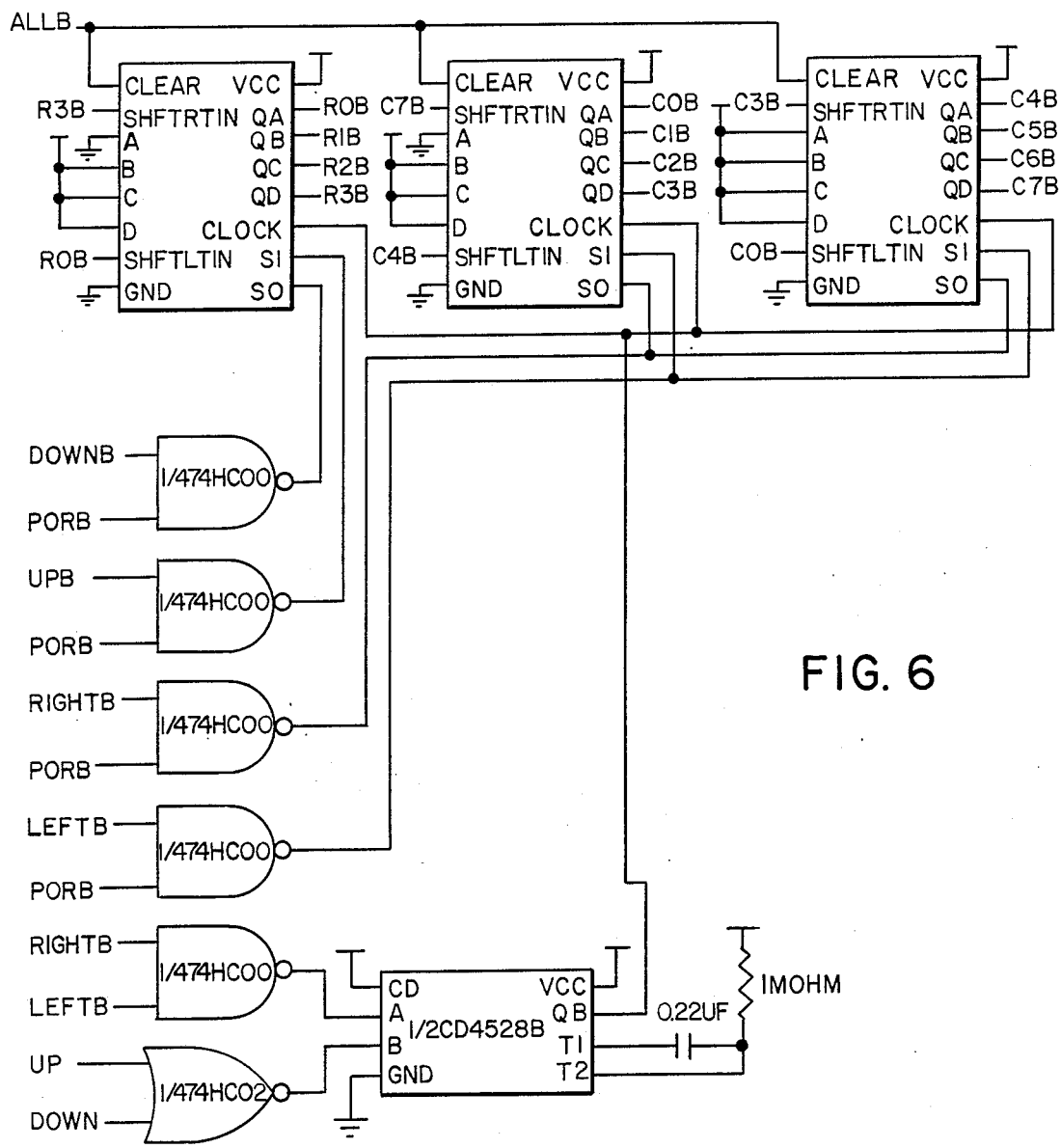
FIG. 6 shows the shift register block circuit diagram for the first embodiment of the present invention.

The direction signals feed the shift register block shown in FIG. 6. Three 4-bit bidirectional universal shift registers (74HC194) are used, with their truth table shown in Table B.

TABLE B

| | INPUTS | | | | | | | | | OUTPUTS | | | |
|---|---|---|---|---|---|---|---|---|---|---|---|---|---|
| CLEAR | S1 | S0 | CLOCK | SHFT LT IN | SHFT RT IN | A | B | C | D | QA | QB | QC | QD |
| L | X | X | X | X | X | X | X | X | X | L | L | L | L |
| H | X | X | L | X | X | X | X | X | X | QA0 | QB0 | QC0 | QD0 |
| H | H | H | ↑ | X | X | a | b | c | d | a | b | c | d |
| H | L | H | ↑ | X | H | X | X | X | X | H | QAn | QBn | QCn |
| H | L | H | ↑ | X | L | X | X | X | X | L | QAn | QBn | QCn |
| H | H | L | ↑ | H | X | X | X | X | X | QBn | QCn | QDn | H |
| H | H | L | ↑ | L | X | X | X | X | X | QBn | QCn | QDn | L |
| H | L | L | X | X | X | X | X | X | X | QA0 | QB0 | QC0 | QD0 |

Note:
H = High Level
L = Low Level
X = Irrelevant
↑ = Low to high transition
a,b,c,d = Input level at inputs A, B, C or D, respectively
QA0, QB0, QC0, QD0 = Level of QA, QB, QC or QD, respectively before any change at the outputs
QAn, QBn, QCn, QDn = Level of QA, QB, QC or QD, respectively before the most recent low to high transition of the clock The outputs of these three shift registers are indicators for the location of the cursor; one shift register for the four rows, and two other shift registers for the eight columns. Except when the ALL button is pressed (parking mode), only one of the outputs of each set of shift registers is low at any time, indicating the row-/column the cursor is residing at. For example, when the system is first powered up, R0B and C0B are low, R1B–R3B and C1B–C7B are all high, indicating that the cursor is on sector R0C0.

Inputs A, B, C and D are used to parallel load the initial conditions into the shift registers. Upon power-up, PORB pulses low, causing S0 and S1 of all three shift registers to pulse high, loading a low in R0B and C0B, and highs in all other outputs. This corresponds to the initial cursor position on R0C0. Thereafter, direction buttons generate the appropriate signals to shift the low in the RBs and in the CBs, thereby causing the cursor to move about the grid.

As shown in FIG. 6, the right shift input is connected to the output immediately to its left and the left shift input is connected to the output immediately to its right, exercising the "wrap" effect explained earlier. This is also called a "barrel shifter-" configuration. A shift occurs on the rising edge of the CLOCK input of the 74HC194s and depending upon the status of S0 and S1 inputs, a right or a left shift occurs. Four 2-input NAND gates (¼ 74HC00) are used to generate the appropriate levels for the S0 and S1 inputs. The CLOCK is generated from a monostable multivibrator (½ CD4528B) which senses a change in the UP, DOWN, RIGHT or LEFT signals. Upon a change, QB output of the CD4528B pulses low and after approximately 70 msec, goes back high. This low to high edge of CD4528B's QB output causes a shift to occur in the corresponding shift register. ¼ 74HC02 (Quad 2-input NOR gate) and ¼ 74HC00 are used as shown in FIG. 6 to generate the B and the A inputs of the monostable multivibrator, respectively. Note that the output of all four 2-input NAND gates mentioned earlier are normally low unless a direction button is pressed. CLOCK affects only one of the two sets of shift registers, depending upon whether UP/DOWN or RIGHT/LEFT buttons are pressed. The monostable multivibrator guarantees that the change in the direction signals have propagated to the S0/S1 inputs before the shift registers are clocked.

The low in R0B is propagated to R1B, R2B, R3B and again to R0B upon consecutive pressing of the DOWN button. UP button causes low to shift in the opposite direction. The low in C0B is propagated to C1B, C2B, ..., C7B and again to C0B upon consecutive pressing of the RIGHT button. LEFT button causes the low to shift in the opposite direction.

When the ALL button is pressed, ALLB signal which is tied to the CLEAR inputs of the 74HC194s, is pulsed low, and all outputs are therefore forced low. This causes all sectors in the grid to turn dark (Parking Mode). When in parking mode, the system needs to be reset by turning it off and then on, if it is to be used again as a shield.

The RB signals (RmB m=0 to 3) and the CB signals (CnB n=0 to 7) feed 32 latching decoders, as shown in FIG. 7, to generate RmCn signals (m=0 to 3, n=0 to 7) which are the decoded signals to drive the grid. In general, for a system with m rows and n columns, there will be m x n latching decoders, generating a total of m x n decoded signals, each feeding one sector of the grid. Rather than showing all 32 latching decoders in this example of a 4 by 8 grid, only one is shown as in FIG. 7. All other 31 latching decoders are similar to the one shown in FIG. 7 except for the name of RB and CB inputs and the RC output. For the sake of completeness, the name of the inputs and outputs for all 32 latching decoder blocks are shown in Table C.

TABLE C

| Row Input Name | Column Input Name | Output Name |
|---|---|---|
| R0B | C0B | R0C0 |
| R0B | C1B | R0C1 |
| R0B | C2B | R0C2 |
| R0B | C3B | R0C3 |
| R0B | C4B | R0C4 |
| R0B | C5B | R0C5 |
| R0B | C6B | R0C6 |
| R0B | C7B | R0C7 |
| R1B | C0B | R1C0 |
| R1B | C1B | R1C1 |
| R1B | C2B | R1C2 |
| R1B | C3B | R1C3 |
| R1B | C4B | R1C4 |
| R1B | C5B | R1C5 |
| R1B | C6B | R1C6 |
| R1B | C7B | R1C7 |
| R2B | C0B | R2C0 |
| R2B | C1B | R2C1 |
| R2B | C2B | R2C2 |
| R2B | C3B | R2C3 |
| R2B | C4B | R2C4 |
| R2B | C5B | R2C5 |
| R2B | C6B | R2C6 |
| R2B | C7B | R2C7 |
| R3B | C0B | R3C0 |
| R3B | C1B | R3C1 |
| R3B | C2B | R3C2 |
| R3B | C3B | R3C3 |
| R3B | C4B | R3C4 |
| R3B | C5B | R3C5 |
| R3B | C6B | R3C6 |
| R3B | C7B | R3C7 |

Figure 8:
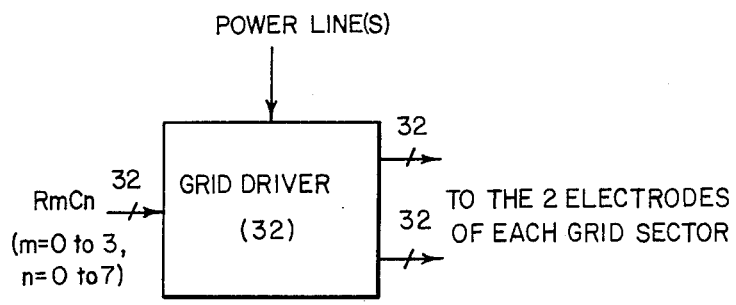
FIG. 8 shows a grid driver mechanism which is included in the inventive circuitry and which drives the grid.
Figure 9:
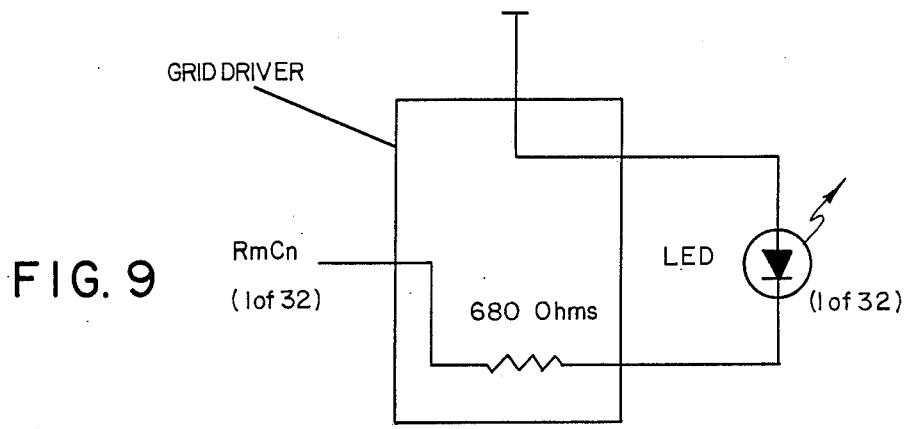
FIG. 9 shows further details of the grid driver of FIG. 8.

The RC signals (R0C0 through R3C7) feed the grid driver as shown if FIG. 8. Depending upon the particular electrochromic material used in the grid, the voltage required to alter its state would be different. The grid driver acts simply as a voltage level translator which applies the appropriate voltage to each sector of the grid in such a way that when the RC signal for that sector is high, the sector is transparent and when it is low, the sector is reflective (darkened state). In order to demonstrate the validity of the design while keeping the cost low, a prototype was constructed and successfully tested including all the circuitry and panel switches described above, but used Light Emitting Diodes (LEDs) as indicators of the status of the grid sectors. An on LED indicated a darkened sector and an off LED indicated a transparent sector of the grid. The Particular grid driver in such case is simply a current limiting resistor as shown in FIG. 9.

As was discussed earlier in this application, the operator of the associated vehicle uses the direction buttons (RIGHT, LEFT, UP and DOWN), perhaps together with the memory buttons (ADD and SUB), to cover the glare by switching the sector or sectors of the grid through which he observes the glare into their darkened state. However, as the direction of the vehicle changes, the glare will be seen by the operator through some other sector or sectors. Hence, he needs to use the panel to move the shaded sector or sectors to the new location on the windshield so that the glare is covered again. An advanced electronic sun shield is contemplated which is similar to the invention disclosed above except for an added feature that performs this correction automatically.

Figure 10:
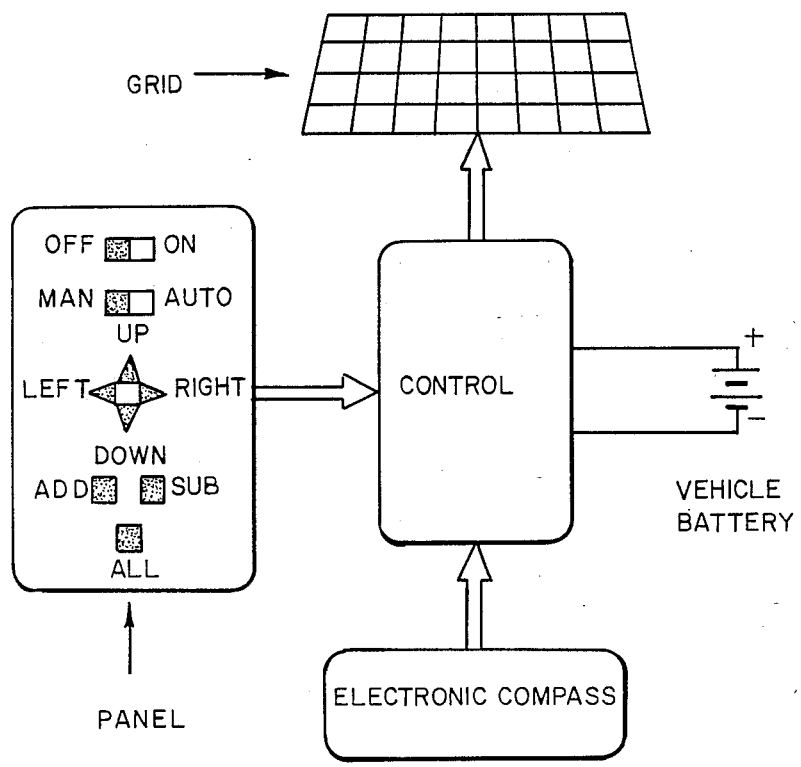
FIG. 10 shows a schematic representation of a second embodiment of the present invention including the use of an electronic compass.

The block diagram of this further embodiment is shown in FIG. 10 and is very similar to that of the embodiment of FIGS. 1-9. The only additions are the electronic compass block and the MAN/AUTO switch.

The electronic compass block uses the Earth's magnetic field to output two signals, AUTORIGHTB and AUTOLEFTB, depending upon the heading of the vehicle. There are several approaches to constructing an electronic compass. One such approach is the "Flux-Gate Magnetometer". Magnetometers and electronic compasses are known per se. The design of the electronic compass block varies depending upon the particular magnetometer used and is straightforward. The block is calibrated such that one low pulse is generated on the AUTORIGHTB signal for every ALPHA degree the vehicle is diverted to the left of the original heading and one low pulse is generated on the AUTOLEFTB signal for every ALPHA degree the vehicle is diverted to the right of the original heading (AUTORIGHTB AND AUTOLEFTB signals are normally high). ALPHA is the angle the vehicle's heading has to change so that the glare from the sun can reach the driver through an adjacent sector of the grid. These two signals cause the cursor to move to the right or to the left of its current position by one sector. In other words, when the direction of the vehicle has sufficiently diverted from its original heading to cause the glare to reach the operator's eyes through an adjacent sector on the windshield, one pulse on the AUTORIGHTB or AUTOLEFTB is generated which causes the cursor to move in the direction needed by one sector, thus covering the glare again. As the heading of the vehicle is further changed, the above sequence is repeated and the glare is kept covered by a shaded sector at all times.

Figure 11:
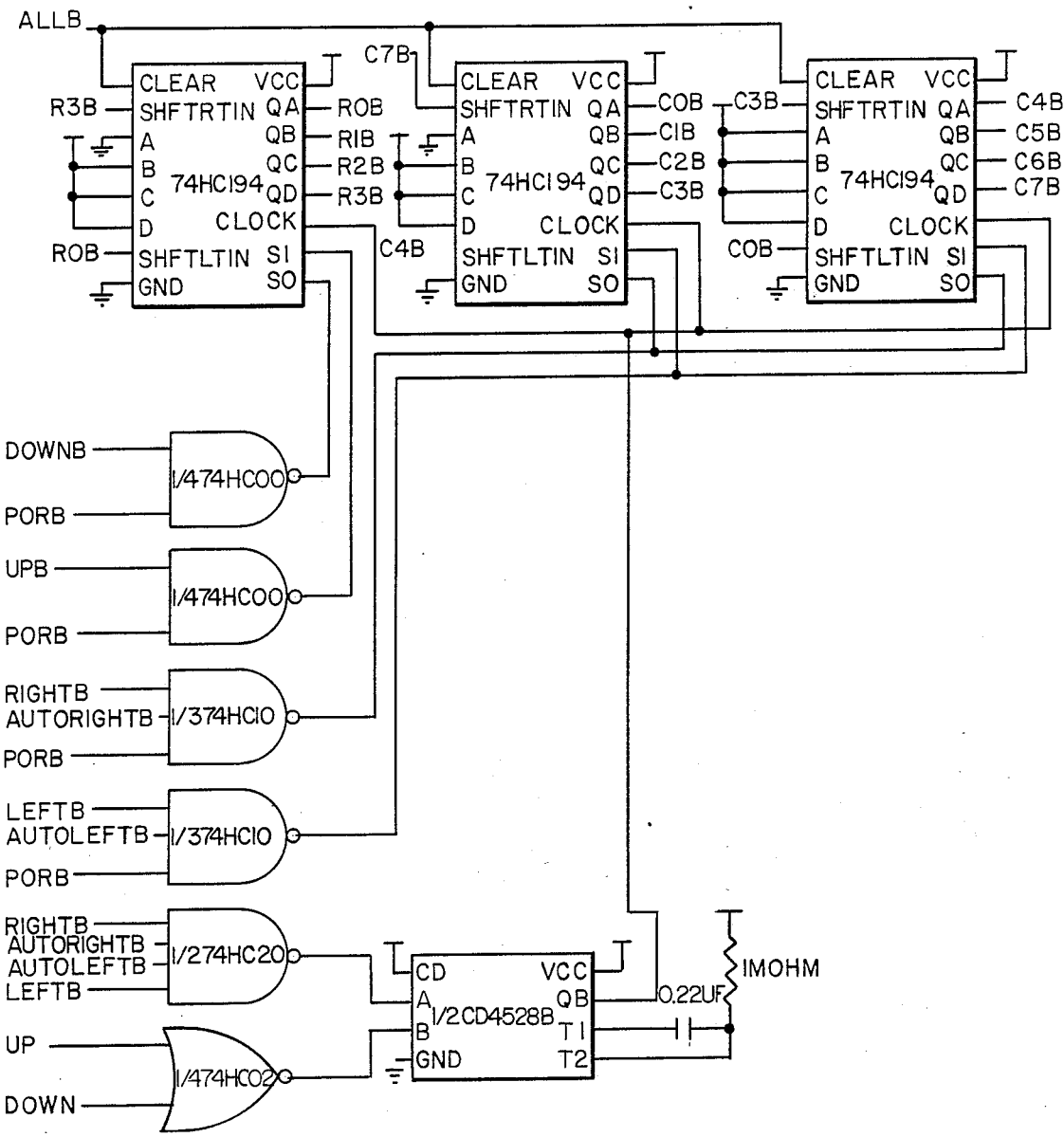
FIG. 11 shows a schematic representation of the shift register block portion of the circuitry for the second embodiment of the present invention.

Comparison of FIGS. 6 and 11 reveals that FIG. 11 is modified with respect to FIG. 6 through the provision of addition to three of the NAND gates (¼ 74HC00) of additional inputs for the AUTOLEFTB and AUTORIGHTB signals. Signals from the electronic compass are inputted via the AUTOLEFTB and AUTORIGHTB ports to the system as explained above to allow automatic shifting of dark region(s) on the grid. Otherwise, operation of the circuit of FIG. 11 is the same as that of FIG. 6.

If automatic adjustment of the shaded sector to the vehicle direction is desired, the following steps are taken:

First, the system is turned on as before, the direction button are used to bring the cursor to where the glare is observed through the windshield. Then, the MAN/AUTO switch is set to AUTO. From this point on, the electronic compass sends the necessary signals to the shift register block to keep the glare covered by a shaded sector at all times.

The same technology can also be used for the driver and passenger windows so that if the glare is seen through them, they too can be darkened to help improve the driving conditions. Additionally, the technology may be applied to any transparent device.

As such, an invention has been disclosed in terms of preferred embodiments thereof which fulfill the objects of the invention as set forth above and provide a new and improved circuit with great utility. Of course, various changes, modifications and alterations to the teachings of the present invention may be contemplated by those skilled in the art. As such, it is intended that the present invention only be limited by the terms of the appended claims.

I claim:
1. A substantially transparent window, the improvement comprising:
    (a) an electrochromic material;
    (b) means dividing the electrochromic material into at least four sectors which may function independently and are arranged in a grid-like pattern with adjacent said sectors abutting;
    (c) said electrochromic material being placed in adjacency to said window for selectively obscuring at least a portion of said window located adjacent said sectors; and
    (d) control means for selectively obscuring some or all of said sectors by controlled application of electrical current on said electrochromic material;
    (e) each said sector being of sufficient size that, when obscured, eyes of a user are shieldable from the sun.
2. The invention of claim 1, wherein said control means includes circuit means for controlling obscuring of any one or more of said sectors.
3. The invention of claim 2, wherein said circuit means includes a shift register block allowing apparent movement of an obscured area from sector to sector by activating one sector while simultaneously deactivating another sector.
4. The invention of claim 2, wherein said circuit means includes a voltage regulator designed to output about 5 volts.
5. The invention of claim 1, wherein said gridlike pattern is formed on a film of electrochromic material removably affixed to said window.
6. The invention of claim 1, wherein said window comprises a vehicle windshield.
7. The invention of claim 2, wherein said control means includes sub-circuit means for controllably obscuring all of said sectors.
8. In a substantially transparent window, the improvement comprising:
    (a) an electrochromic material;
    (b) means dividing the electrochromic material into at least four sectors which may function independently and are arranged in a grid-like pattern;
    (c) said electrochromic material being placed in adjacency to said window for selectively obscuring at least a portion of said window located adjacent said sectors; and
    (d) control means for selectively obscuring some or all of said sectors by controlled application of electrical current on said electrochromic material said control means including circuit means for controlling obscuring of any one or more of said sectors, said circuit means including compass means for sensing the orientation of said window and, responsive thereto, controlling obscuring of one or more of said sectors.
9. The invention of claim 8, wherein said window comprises a vehicle windshield mounted in a vehicle.
10. The invention of claim 9, wherein said compass means senses the orientation of said vehicle and, responsive thereto, said circuit means controls the obscuring of one or more of said sectors.

* * * * *